United States Patent [19]

Kathiresan et al.

[11] Patent Number: 5,243,675
[45] Date of Patent: Sep. 7, 1993

[54] OPTICAL FIBER CABLE WHICH RESISTS DAMAGE CAUSED BY A HOSTILE ENVIRONMENT

[75] Inventors: Krishnaswamy Kathiresan, Marietta; Manuel R. Santana, Roswell; John W. Shea, Chamblee; Carl R. Taylor, Lawrenceville, all of Ga.

[73] Assignee: AT&T Bell Laboratories, Murray Hill, N.J.

[21] Appl. No.: 869,405

[22] Filed: Apr. 16, 1992

[51] Int. Cl.$^5$ ................................ G02B 6/44
[52] U.S. Cl. ................................ 385/109
[58] Field of Search .................. 385/100, 109

[56] References Cited

U.S. PATENT DOCUMENTS

| 4,109,099 | 8/1978 | Dembiak et al. | 174/107 |
| 4,896,940 | 1/1990 | Kathiresan et al. | 350/96.23 |
| 4,974,926 | 12/1990 | Blee et al. | 350/96.23 |
| 5,000,539 | 3/1991 | Gareis | 385/109 |
| 5,031,996 | 7/1991 | Saller et al. | 385/109 |
| 5,109,457 | 4/1992 | Panuska et al. | 385/109 |

OTHER PUBLICATIONS

McKay, et al., *Qualification Procedure For Fiber Optic Cable Design*, Int. Wire & Cable Symposium Proceedings 1986, pp. 307–313.

Vyas, et al, *Design and Development of Steam Resistant Fiber Optic Cable*, Int. Wire and Cable Symposium Proceedings 1991, p. 55.

*Primary Examiner*—Akm E. Ullah
*Attorney, Agent, or Firm*—Edward W. Somers; Donald E. Hayes, Jr.

[57] ABSTRACT

A hermetically sealed optical fiber cable (20) includes a core (21) comprising a plurality of optical fiber ribbons (22,22) disposed within a core tube (30) comprised of a high temperature resistant polymeric material. The core tube is disposed within a hermetic sealing member (40) which comprises a metal of low electrochemical activity having a sealed seam. An outer jacket (50) is disposed about the hermetic sealing member. The core may be filled with a waterblocking filling material (35). The material of the core tube undergoes only limited degradation because of the limited amount of oxygen and/or moisture trapped in the hermetically sealed cable. The filling material and/or other materials of the cable scavenge moisture and oxygen which travel longitudinally of the cable and reach portions of the cable subjected to a high temperature because of a leak in an adjacent steam line. The filling material and/or other materials are such that they cooperate with polymeric materials of the cable to prevent oxygen and humidity from degrading coating material of the optical fiber. Further, the filling material and the core tube are such that degradation of the core tube in the hermetically sealed cable is avoided.

14 Claims, 3 Drawing Sheets

OPTICAL FIBER CABLE WHICH RESISTS DAMAGE CAUSED BY A HOSTILE ENVIRONMENT

TECHNICAL FIELD

This invention relates to an optical fiber cable which resists damage caused by a hostile environment. More particularly, this invention relates to an optical fiber cable which is capable of resisting damage when exposed to a high temperature, high moisture, high velocity steam environment.

BACKGROUND OF THE INVENTION

In metropolitan areas it is not uncommon to run communications cable in underground ducts which are located adjacent to steam lines. The operating condition of the steam varies generally from 0.7 MPa (100 psig) to 2.8 MPa (400 psig). The corresponding minimum temperature of the steam, which is higher if superheated, varies from 165° C. (328° F.) to 230° C. (445° F.).

The leaking of underground steam piping is of great concern to telecommunication operating companies. This is particularly true inasmuch as underground steam ducts in many cities may be as old as 100 years and prone to leakage because of aging and fatigue. Optical fiber cables placed in the neighborhood of steam pipes are vulnerable to damage and failure when there is a steam leak. When a leak in a high pressure steam pipe occurs, adjacent optical fiber cable is exposed to a high temperature, high moisture, and high velocity environment. The values, of course, depend on the distance between the location of the leak in the steam pipe and the cable. It is estimated from field data that the maximum steam temperature to which the cables may be exposed when there is a steam pipe leak could be as high as 140° C. (284° F.). The duration of exposure could be as long as a few years. Currently available commercial optical fiber cables have been found to fail in such an environment. The failures are not surprising because cables presently made were not designed for such an environment. The high temperature, high moisture, and high velocity environment causes cable materials to degrade or melt, resulting in the failure of optical fibers over a period of time.

Because steam may have such adverse effects, it becomes necessary for a cable adjacent to steam lines to have a sheath system which is capable of preventing damage to optical fiber when the cable is exposed to escaping steam. Important considerations for a steam-resistant optical fiber cable are high temperature and high moisture conditions. These conditions relate directly to the basic high temperature and hydrolytic stability performance of the materials of a sheath system of the cable. The high velocity condition is more closely related to the structural integrity and mechanical performance of the cable, and should be used as a secondary design consideration of the cable along with the cable racking condition, that is, how the cable is supported along its length.

When a leak occurs in an adjacent steam line, escaping steam can cause a portion of the cable to be exposed to a high temperature. For a conventional non-hermetically sealed cable, unlimited oxygen and moisture from the atmosphere can reach the cable materials at the steam line leak. The cable materials at that location are exposed to humidity and oxygen in a high temperature environment. A high temperature steam environment is conducive to hydrolysis and a high moisture condition hydrolizes many thermoplastic materials. Such hydrolytic stability degradations are accelerated significantly as the temperature is increased. On the other hand, the high temperature condition alone without a high moisture condition and oxygen environment may be less detrimental to cable materials, especially those materials which are thermally stable at high temperatures in the absence of moisture and oxygen.

A high temperature steam environment also is conducive to the hydrolysis of acrylate materials. Acrylate materials typically are used to coat drawn optical fiber. Optical fibers with conventional acrylate coatings are capable of sustained performance at relatively high temperatures, but not in the presence of the high moisture or oxygen. Thus, it becomes imperative that critical components of a steam-resistant cable be protected from the combination of a high temperature and high humidity and/or oxygen in order for the cable to perform satisfactorily for a substantial period of years.

In the past, polyethylene-jacketed, lead-shielded cables which are relatively expensive were used in steam environments. Because it tends to develop cracks or melt when exposed to high temperatures for a long period of time, the polyethylene jacket is sacrificial only and the cable relies on inner portions of its sheath system for sustained performance in a steam environment. Cables having a polyethylene jacket extruded over a soldered seam steel shield also have been used. However, in cables of this latter construction, the soldered seam generally has not been continuous.

In one optical fiber cable suitable for use adjacent to steam piping, the cable includes a core comprising at least one optical fiber transmission medium and a first tubular member in which is disposed the core and which comprises a plastic material that resists degradation when exposed to relatively high temperatures. A second plastic tubular member which is referred to as an inner jacket is disposed about the first tubular member and comprises a plastic material. Interposed between the first and second tubular members is a strength member system. Disposed about the second tubular member is a hermetic sealing member which comprises a metallic material having a relatively low chemical or electrochemical reactivity. An outer jacket comprising a plastic material is disposed about the hermetic sealing member. In a preferred embodiment, a filling composition of matter is disposed in the core to provide a waterblocking function. Also, in the preferred embodiment, a waterblocking member such as a yarn or tape which includes a superabsorbent polymeric material is interposed between the first and the second tubular members. See application Ser. No. 07/785,602 filed on Oct. 30, 1991 now allowed, in the names of K. Kathiresan, A. J. Panuska and M. R. Santana.

The last-mentioned hermetically sealed cable structure provides protection for the transmission media from the circumferential entry of oxygen and humidity at the location of a leak in a steam line. However, the hermetic seal does not prevent the limited diffusion of oxygen and moisture longitudinally along the cable.

In a hermetically sealed environment, it has been found that materials which appear to be useful in a cable exposed to a steam environment have been found to degrade whereas those that may be eliminated at first thought may turn out to be effective. Indeed it has been found that particular core tube materials have darkened, indicating degradation, in the presence of particular filling compositions whereas others do not.

What is needed and what seemingly does not appear to be available in the prior art is a hermetically sealed optical fiber cable which is capable of providing reliable transmission for a substantial period of time notwithstanding exposure to a high temperature, high humidity and high velocity steam environment. Of course, such an optical fiber cable must not have an unduly large diameter and must be reasonable in cost.

SUMMARY OF THE INVENTION

The foregoing problems of the prior art have been overcome by an optical fiber cable of this invention. A hermetically sealed optical fiber cable comprises at least one optical fiber transmission medium which includes at least one layer of a coating material and a tubular member which encloses the at least one optical fiber transmission medium. The tubular member includes a polymeric material which is thermally stable after having undergone limited degradation in a hermetically sealed environment when exposed to high temperature. The initial oxygen and moisture present within the hermetic environment are consumed in the high temperature region by the limited degradation of the polymeric material beyond which the degradation of the polymeric material is substantially slowed by the limited amount of oxygen and moisture available for further degradation. The cable includes blocking means for restricting the longitudinal flow of oxygen and/or moisture within the tubular member thereby limiting the amount of oxygen and moisture which are available to react in a high temperature zone caused by a hostile environment. Included also is a sheath system which includes means for providing a hermetic seal between the at least one optical fiber transmission medium and the exterior of the cable.

In a preferred embodiment, the tubular member is a plastic first tubular member and a second tubular member comprising a plastic inner jacket is disposed about the first tubular member. The hermetic seal comprises a metallic tubular member which is disposed about the inner jacket and which is enclosed by a plastic outer jacket. A waterblocking filling material disposed within the first tubular member is effective to consume oxygen and moisture and is relatively non-reactive with the first tubular member.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
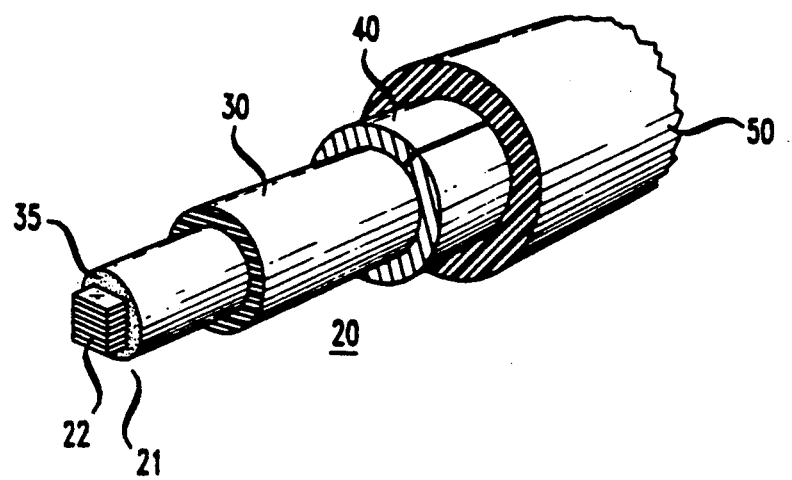
FIG. 1 is a perspective view of a cable which resists damage caused by steam.
Figure 2:
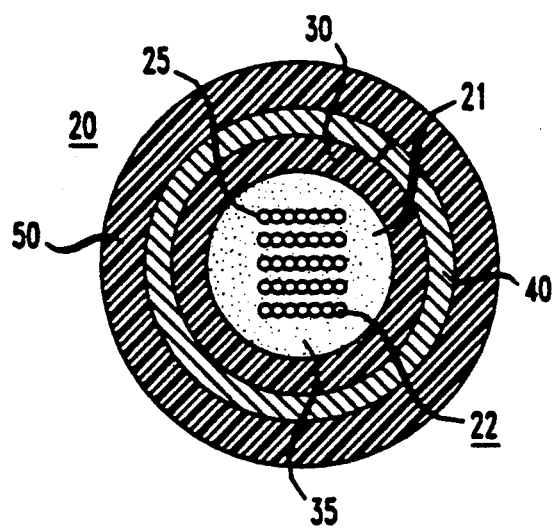
FIG. 2 is an end cross-sectional view of the cable of FIG. 1.

Referring now to FIGS. 1 and 2, there is shown a hermetically sealed optical fiber cable which is designated generally by the numeral 20. The optical fiber cable includes a core 21 which includes at least one optical fiber. In the embodiment shown, the core includes one or more optical fiber ribbons 22—22 which are undulated. Each optical fiber ribbon comprises a plurality of optical fibers 25—25 which are disposed in a planar array and held together by a matrix material. See U.S. Pat. No. 4,900,126 which issued on Feb. 13, 1990 in the names of K. W. Jackson, G. A. Lochkovic, P. D. Patel, M. L. Pearsall and J. R. Petisce and which is incorporated by reference hereinto.

Enclosing the optical fiber is a first tubular member 30, often referred to as a core tube. The first tubular member generally is made of plastic material. In a preferred embodiment, the tubular member has an inner diameter of about 0.33 inch and an outer diameter of about 0.41 inch and a length which is less than that of each ribbon 22.

The cable 20 may include materials which are thermally stable but which may degrade when exposed to high temperatures in the presence of oxygen and moisture. Such a material is polybutylene terephthalate (PBT), for example, of which the first tubular member 30 in a preferred embodiment is comprised.

The cable 20 of this invention also may include waterblocking provisions, such as, for example, a hydrocarbon-based filling material 35 (see FIGS. 1 and 2). As seen in FIG. 2, the filling material 35 may be disposed in the tubular member 30 and fill any interstices among the ribbons 22—22 and among fibers 25—25 should the core include optical fibers in non-ribbon form. A suitable filling material 35 is a colloidal gel such as that which is disclosed in U.S. Pat. No. 4,701,016 which issued on Oct. 20, 1987 in the names of C. H. Gartside III, A. C. Levy, Bob J. Overton and Carl R. Taylor and which is incorporated by reference hereinto.

A colloidal gel typically is a semi-liquid substance comprising a thickening agent in a liquid carrier. All types of gelling agents form network structures in which the carrier is held by capillary forces. When a low stress is applied to a gel, the material acts substantially solid-like, but if the stress is above critical value, the material flows and the viscosity decreases rapidly, a behavior frequently described as thixotropic.

Colloidal gels have been used as communication cable filling compounds. In optical fiber cables, it is essential that, in addition to waterblocking, the filling gel maintains the optical fibers in a low stress state so that signal attenuation is minimized. Whereas the shear modulus has been considered the prime variable for optimizing performance of optical fiber cable filling compounds, a further parameter, the critical stress at which the gel yields, must be controlled.

A grease composition comprising oil, colloidal particle filler, and, optionally, a bleed inhibitor is disclosed in the above-identified Gartside, et al. U.S. Pat. No. 4,701,016. The grease typically has a critical yield stress below 140 Pa at 20° C., preferably below 70, or 35 Pa for some applications, and a shear modulus which is less than about 13 kPa at 20° C. Suitable compositions comprise 77 to 95% b.w. of ASTM type 103, 104A or 104B paraffinic or naphthenic oil, or polybutene oil; 2 to 15% b.w. of hydrophobic or hydrophilic fumed silica; and optionally, up to 15% b.w. of styrene-rubber or styrene-rubber styrene block copolymer, or semiliquid rubber.

Another composition of matter which is suitable for filling the core 21 is disclosed in application Ser. No. 07/691,770 which was filed on Apr. 26, 1991 U.S. Pat. No. 5,187,763 in the name of C. F. Tu, and which is incorporated by reference hereinto.

About the core tube or tubular member 30 is disposed another tubular member 40 which is a hermetic sealing member (see FIGS. 1 and 2) and which is adapted to seal the core from the entry of moisture and air. The tubular member is made preferably of stainless steel, or alternatively of copper. Typically, the hermetic sealing member is made by forming a tube about an advancing cable core from a flat tape of metallic material on a manufacturing line to form a longitudinal seam which then is welded. Subsequently, the tube is drawn down about the advancing core 21 which is being moved along the manufacturing line.

Figure 3:
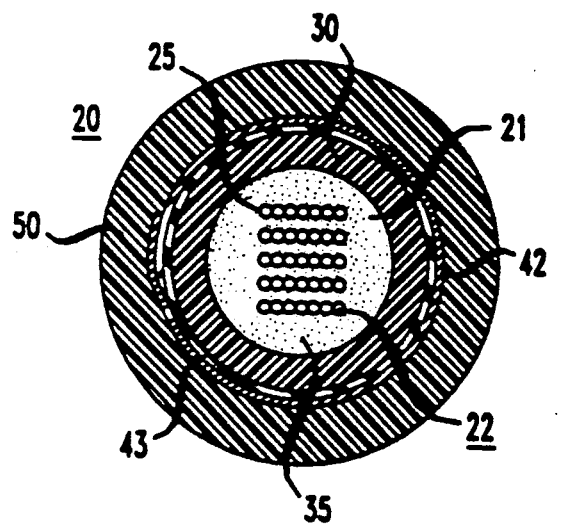
FIG. 3 is a cross-sectional view of an alternative embodiment of the cable of FIG. 1.

In one embodiment (see FIG. 3), a hermetic tubular member 42 is made from a metallic tape which is corrugated to provide flexibility. The thickness of the tape from which the corrugated tubular member is made preferably is in the range of about 0.010 to 0.020 inch. Interposed between the corrugated tubular member 42 and the first tubular member 30 may be a layer 43 of cellular material such as a foamed polymeric material, for example, which has a thickness in the range of about 0.010 to 0.020 inch and which is effective to cushion the first tubular member during the formation of the corrugated metallic tape thereabout. In the alternative, the layer 43 may comprise a waterblocking member such as a laminate comprising two tapes having a superabsorbent polymeric material in powder form therebetween.

The hermetic sealing member 40 or 42 is effective to prevent moisture from steam, for example, reaching the cable core along radial flow paths. As mentioned hereinbefore, moisture can have a deleterious effect on optical fiber because of hydrogen generation and because of the characteristics of conventionally used acrylate optical fiber coating materials.

Hydrogen-induced attenuation at both the 1310 nm and 1550 nm single mode operating wavelengths of optical fiber, as well as in multimode optical fibers, has been observed in installed, armored underwater optical fiber cables. Studies have shown that even when the core portion itself of optical fiber is not exposed to water, added loss can occur.

Hydrogen may be generated by corrosion of metals. All metals, except perhaps the noble metals, e.g. gold and platinum, have some finite corrosion rate in natural environments. When a metal corrodes, the surface is covered by micro/macroscopic cells where an anodic (oxidation) reaction occurs, i.e. corrosion of the metal, but the surface also is covered by micro/macroscopic cells where a cathodic (reduction) reaction takes place. In steam environments, this cathodic reaction can produce deleterious hydrogen molecules. In order for corrosion to occur, a cathodic reaction must occur to consume the electrons liberated in a corrosion reaction, otherwise the corrosion reaction cannot take place. Metals characterized by a relatively high chemical or electrochemical reactivity are referred to as active metals, and will be more likely to produce hydrogen than a metal characterized by a relatively low chemical or electrochemical reactivity.

The foregoing problem has been overcome by a sheath system that includes a hermetic seal comprising a tubular member which is made of a metal characterized by a relatively low electrochemical reactivity such as stainless steel or copper and which has a sealed seam. Such an arrangement prevents the ingress of moisture from superheated steam escaping from a leak in an adjacent steam pipe, for example, and the consequent generation of hydrogen. Also, the hermetic sealing, tubular member provides suitable mechanical strength for the embodiment depicted in FIG. 1. A suitable alternative to the stainless steel hermetic sealing member is copper, which also does not react to form hydrogen.

Disposed about the hermetic sealing, tubular member 40 is an outer jacket 50. The outer jacket 50, as is the tubular member 30, preferably is made of a plastic material which can withstand exposure to steam environments. Such a material may be TEFZEL®, TEFLON® FEP, TEFLON® PFA or ethylene-chlorotrifluoroethylene (E-CTFE) plastic material, for example. Should it be determined that the outer jacket may be sacrificial, then any of the common jacketing materials such as polyethylene, for example, may be used.

The cable 20 has an outer diameter of about 0.55 inch. The hermetic sealing member may have a thickness of about 0.025 inch with an outer diameter of about 0.46 inch. Notwithstanding its small outer diameter, the cable 20 is resistant to high temperature, high humidity and high velocity steam.

Figure 4:
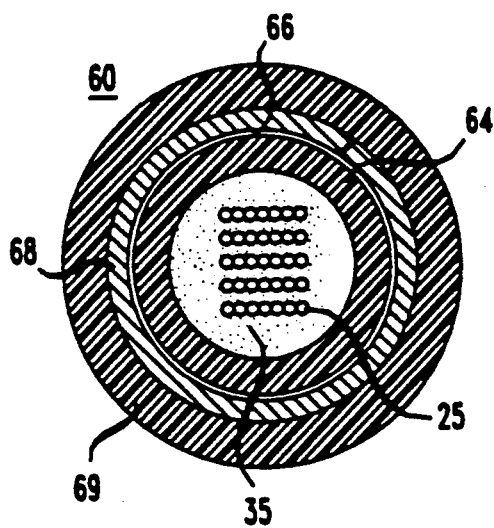
FIG. 4 is an end cross-sectional view of another embodiment of a steam-resistant cable having a filled core.

In FIG. 4 is shown another embodiment of cable of this invention. A cable 60 includes a core comprising a plurality of the ribbons 22—22 of optical fibers 25—25 disposed within a tubular member 64 which is made of the same material as the tubular member 30 in FIG. 1. The core may be filled with a waterblocking material 35 such as that described earlier with respect to the cable 20.

Disposed about the tubular member 64 is a waterblocking member 66. The waterblocking member may be a laminate comprising two tapes having a superabsorbent polymer in powder form disposed between the tapes or it may be a superabsorbent waterblocking yarn. A suitable waterblocking yarn is disclosed in U.S. Pat. No. 4,815,813 which issued on Mar. 28, 1989 in the names of C. J. Arroyo, H. P. Debban, Jr. and W. J. Paucke. In another embodiment, the waterblocking member 66 may comprise a suitable tape which has been impregnated with a superabsorbent material. See U.S. Pat. No. 4,867,526 which issued on Sep. 19, 1989 in the name of C. J. Arroyo. About the waterblocking member 66 is disposed a hermetic sealing member 68 which as in the cable 20 is comprised of a metal such as stainless steel which is characterized by a low electrochemical reactivity. The hermetic sealing member 68 as shown has been formed from a corrugated tape of stainless steel but as in the embodiment depicted in FIG. 3, the hermetic sealing member may be formed from a flat tape. An outer jacket 69 is disposed about the hermetic sealing member 68 and comprises a plastic material such as the plastic material of the outer jacket 50 in the embodiment shown in FIG. 2.

Figure 5:
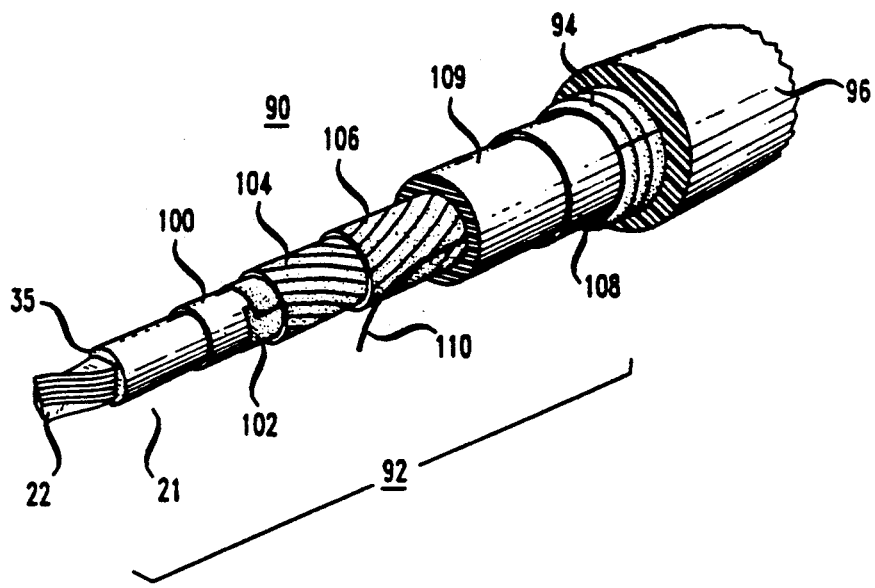
FIG. 5 is a perspective view of a preferred embodiment of cable of this invention which may comprise a commercially available optical fiber cable which has been provided with an oversheath.

A preferred embodiment is depicted in FIG. 5. In it, a cable which is designated generally by the numeral 90 includes a cable which is designated generally by the numeral 92 and which is provided with an oversheath comprising a corrugated metallic, hermetic sealing, tubular member 94 which has a welded longitudinally extending butt seam and an outer jacket 96.

The cable 92 which is provided with an oversheath may be any of several commercially available cables such as the one shown in FIG. 5. In FIG. 5, the cable 92 includes a core 21, a first tubular member 100 in which may be disposed a stack of optical fiber ribbons 22—22 and a filling composition of matter 35 such as that used in the cable depicted in FIG. 1. About the outwardly facing surface of the tubular member 100 is disposed a waterblocking member 102 which may comprise a laminate or an impregnated tape or waterblocking yarn as described hereinbefore. Disposed about the waterblocking member 102 are two layers 104 and 106 of strength members with the strength members in the two layers being wound in opposite helical directions. Interposed between the hermetic sealing member 94 and the outer layer 106 of strength members are a layer of 108 of cellular material such as a foamed polymeric material, for example, or a waterblocking layer and an inner jacket 109 which may be regarded as a second tubular member. A rip cord 110 extends longitudinally within the layer of cellular material. Preferably, the material of the tubular member 100 is PBT which is the same as that of the tubular member 30 of the cable 20 of FIGS. 1 and 2.

In the alternative, the cable 92 may include a strength member system such as one disclosed and claimed in U.S. Pat. No. 4,844,575 which issued on Jul. 4, 1989 in the names of M. D. Kinard, A. J. Panuska, M. R. Reynolds, M. R. Santana and G. H. Webster or one disclosed and claimed in application Ser. No. 07/649,628 which was filed on Feb. 1, 1991, now U.S. Pat. No. 5,109,457 in the names of A. J. Panuska, P. D. Patel, M. R. Santana and A. J. Vedejs, both of which are incorporated by reference hereinto. Also, the core may comprise a plurality of optical fibers 25—25 which may be arranged in units such as is shown in U.S. Pat. No. 4,826,278 which issued on May 2, 1989, in the names of C. H. Gartside III, A. J. Panuska and P. D. Patel.

The embodiment of FIG. 5 provides additional resistance to penetration by moisture in steam environments. The overall outer diameter of the cable 90 is in the range of from about 0.5 to 1.0 inch.

Cables of this invention are characterized by a core tube comprising polymeric material which is thermally stable in the absence of oxygen and/or moisture. Such a material generally has not been considered for high temperature uses because of its reactivity with oxygen and/or moisture at high temperatures in a non-hermetic environment. In a hermetically sealed cable, such a material will undergo only limited degradation because of the limited amount of oxygen and/or moisture which is trapped in the cable structure but which is removed by reaction with the core tube after which the polymeric material thereof will be preserved.

The suitability of materials such as PBT in a cable which may be exposed to escaping steam is a surprising result. In the prior art, such materials are not looked on with favor insofar as their use in cables which are exposed to oxygen and moisture. For example in an article "Design and Development of Steam Resistant Fiber Optic Cable" authored by M. K. R. Vyas, et al., and appearing in the 1991 *International Wire and Cable Symposium Proceedings* beginning at page 55, the authors say that because a high temperature steam environment is conducive to hydrolysis of both polyesters and acrylates, it is evident that standard PBT tubes in traditional loose tube cable construction are inappropriate for the protection of optical fibers in such application. Further, the authors in the abovementioned article say that alternative tube and/or jacket materials are required and that ideal materials must be stable to long term exposure of at least 120° C., must be hydrolytically stable, must suppress moisture penetration to the vicinity of the optical fibers and should be readily processable. Other key attributes listed are good chemical and compressive resistance, high strength and low shrinkage.

Conventional high temperature resistant materials, such as fluorocarbons, for example, are more stable than other polymeric materials such as PBT, for example, in a non-hermetically sealed environment when exposed to oxygen and moisture. But in a hermetic environment such as in a cable which includes a hermetic sealing, tubular member, these materials may emit corrosive elements which remain in the hermetically sealed environment. Avoided in cables of this invention are materials which may be stable at high temperatures in the presence of oxygen and/or moisture in a non-hermetic environment but which generate corrosive by-products at high temperature. Such corrosive by-products in a non-hermetic cable leave the cable but in a hermetically sealed structure are captured and possibly corrode adjacent cable components. In a hermetically sealed cable, it has been found that PBT reacts with the limited oxygen and moisture supply in a high temperature environment such as adjacent to a leak in a steam line, but that far less reaction occurs than in materials such as some fluorocarbons which in the prior art have been used because of their thermal stability.

The materials of cables of this invention are such that each in a hermetically sealed cable of composite materials does not interact with adjacent materials to accelerate degradation or is not itself adversely affected by another material or materials of the cable when subjected to a high temperature in a hermetic environment. For use in a hermetically sealed cable, the material of the core tube is one which is thermally stable but one which may degrade at high temperatures in the presence of oxygen and moisture. Bonds that hold up under high temperature are destroyed in an oxygen and moisture environment. In hermetically sealed cables of this invention, only minimum amounts of oxygen and moisture are present. After these small amounts of oxygen and moisture have been consumed, the stability of the product is maintained generally for the life of the product because then the cable is subject to a thermally stable, as opposed to a hydrolytically and/or oxidatively unstable, condition.

What also is included with cables of this invention is material which restricts the flow of two damaging elements of oxygen and humidity to areas of high temperatures caused by steam leaking from an adjacent steam line, for example, where they can react with other cable materials and result in the degradation of the optical fiber coating materials, for example. In the preferred embodiment, the restriction of the flow of oxygen and/or moisture longitudinally within the core is accomplished with a filling material. With a filling material in place, small quantities of oxygen and/or moisture may diffuse along the core. As the oxygen and/or moisture approach a hot zone caused by steam escaping from an adjacent steam line, the filling material is effective to scavenge the oxygen and moisture.

Cables of this invention need not include a waterblocking filling material in a core thereof. However, in those instances, other arrangements become necessary to restrict the air space in the core which otherwise would allow easy diffusion of oxygen and/or moisture along the core to the vicinity of high temperature caused by a leak in an adjacent steam line. Such easy diffusion may be prevented, for example, by using tightly buffered optical fibers, by using a higher packing density or by packing the core about the optical fibers with a yarn material.

In a hermetically sealed cable, materials such as particular waterblocking tapes may act as scavengers for elements such as oxygen and moisture that normally degrade the cable. It has been found that typically waterblocking tapes include moisture, albeit a relatively low amount. Accordingly, when a tape is used also to scavenge moisture, the tape preferably is dried before it is included in a cable so that the moisture therein is not available as a reactant.

The materials in cables of this invention are not used because of their individual aging characteristics but because of the behavior of each material when aged in the composite structure of a hermetically sealed cable. Without these considerations of cables of this invention, aging of material combinations in a hermetically sealed cable may result in unexpected material interactions which lead to degradation of materials in the cable. Two examples follow.

Fluorocarbon materials are known to be thermally and hydrolytically stable materials which are used in many demanding applications. The aging of one of those materials, E-CTFE, at 170° C. and 190° shows excellent retention of elongation properties and appearance. However, when the E-CFFE material is aged in a hermetically sealed cable, the E-CTFE darkens much more rapidly than when aged in a non-hermetic environment, and, in fact, it exhibits cracking at time periods much shorter than expected from an aging of the same material in a non-hermetic environment. In addition, the filling material of the cable and fiber acrylate coating materials darken more rapidly and more severely than when thermally stable polymeric materials, e.g., PBT, are aged in contact with the filling material in a hermetically sealed cable. This severe darkening of the materials indicates that adverse chemical reaction has occurred in the fluorocarbon plastic material which results in an accelerated degradation of the other cable materials.

In tests, it has been observed that no darkening nor cracking of a fluorocarbon material of a core tube occurs when exposed to a temperature of 170° C. for 60 days in a non-hermetic air environment. However, cracking of the fluorocarbon material occurs when exposed to a temperature of 170° C. for 35 days in the presence of a hydrocarbon filling composition in a hermetically sealed cable. When exposed for 21 days to a temperature of 170° C. in a hermetically sealed cable, PBT displays a light tan color. At 35 days in the presence of a hydrocarbon based filling composition, a PBT core tube in the same hermetically sealed cable had darkened but not cracked as had the fluorocarbon core tube.

A second example of unexpected results from aging tests of components in a hermetically sealed cable is the aging of PBT tubular members in which is disposed fiber ribbon. One tubular member was filled with a very thermally stable silicone material and another with a hydrocarbon based filling material which includes antioxidants. After exposure at elevated temperatures, the silicone material appeared unchanged, showing no evidence of oxidation. On the other hand, the hydrocarbon based system had darkened and exhibited reduced resistance to oxidation. This indicates that oxygen reacted with the system and was scavenged from the system by the hydrocarbon-based filling material. The somewhat unexpected result is that the optical ribbons and the core tube in the presence of the hydrocarbon based system showed significantly less oxidation degradation than in the presence of the silicone filling system. The hydrocarbon filling material acted as a scavenger for oxygen, protecting the critical cable arrangements from oxidative attack.

Figure 6:
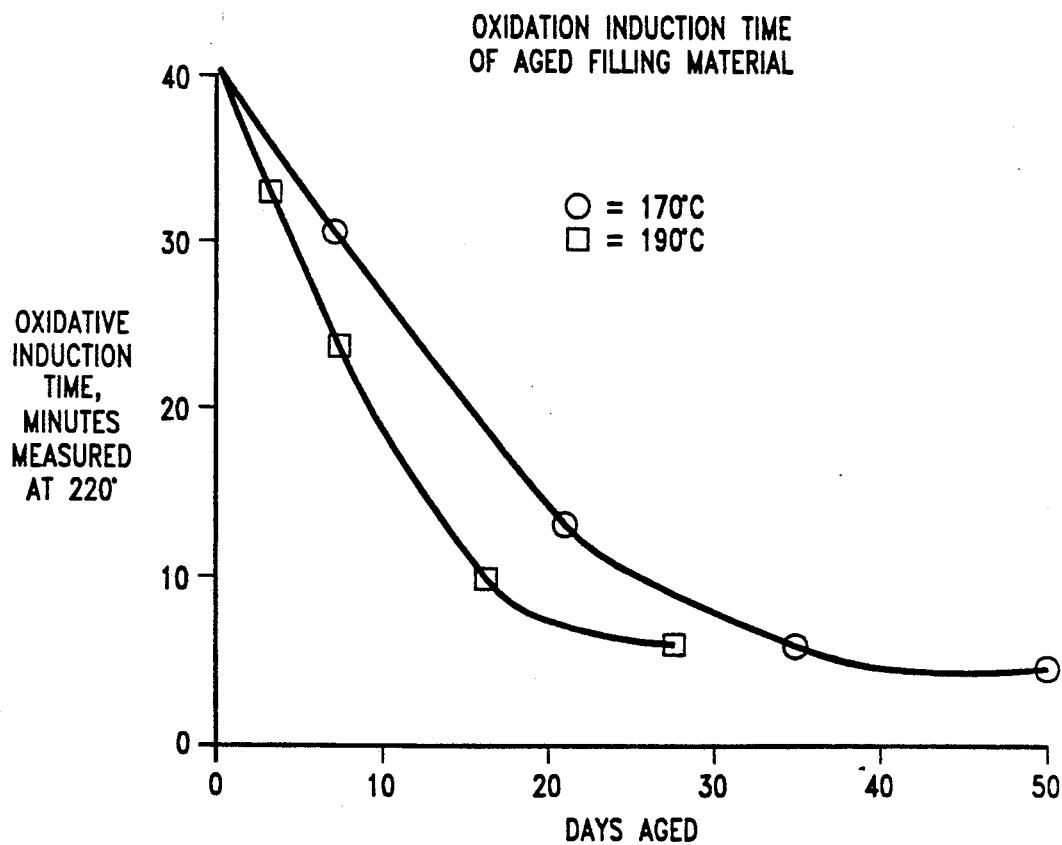
FIG. 6 is a graph of oxidative induction time versus days aged for a filling material.

A silicone non-antioxidant filling material is thermally stable and there is no evidence that its oxidation induction time (OIT) is lowered with aging. Oxidative induction time is a measure of the time it takes at a given temperature for antioxidant to be consumed by oxygen. If such material had absorbed oxygen, one would expect the OIT to decrease. In a stabilized hydrocarbon-based filling material, the OIT drops significantly over days aged (see FIG. 6) indicating antioxidant in the system has been depleted. The oxygen is reacting with the stabilized filling material and hence the oxygen is prevented from reaching critical components of the cable in the vicinity of the high temperature caused by a steam leak.

Priorly, the filling material has been known as a barrier to the passage of water along a cable. The antioxidant is included in the filling material to maintain the filling material in condition to do its job. What has not been recognized is the use of a filling material as a scavenger in a hermetically sealed cable to prevent moisture and oxygen from reaching critical areas of the cable adjacent to which there has been a steam leak. The filling material itself reacts with oxygen thus protecting cable components from degrading rapidly. Also not recognized is the cooperation of the filling material with polymeric materials of the core tube, for example, to prevent the degradation of optical fiber coatings. Further not recognized was the possibility of an adverse reaction of a filling material with potential core tube materials.

The unexpected results seen in aging of material composites has demonstrated that proper material selection for a steam-resistant cable which is hermetically sealed cannot be based on individual material testing but must be based on the aging of materials in their composite setting. In a cable of this invention, adverse material reactions between individual materials do not occur. Further, one or more of the components provides advantageous behavior such as scavenging oxygen and humidity which results in extended life for critical cable components.

It is be understood that the above-described arrangements are simply illustrative of the invention. Other arrangements may be devised by those skilled in the art which will embody the principles of the invention and fall within the spirit and scope thereof.

We claim:

1. A hermetically sealed optical fiber cable, which comprises:

at least one optical fiber transmission medium which includes at least one layer of a coating material;

a tubular member which is disposed about said at least one optical fiber transmission medium wherein said tubular member comprises a polymeric material which is thermally stable after having undergone limited degradation by reacting with and consuming limited quantities of oxygen and moisture available in a high temperature zone of a hermetically sealed environment; and a sheath system which includes blocking means for restricting the amount of detrimental gases, moisture, and fluids in a high temperature zone caused by a hostile environment by providing a hermetic seal between said tubular member and an exterior of said cable.

2. The optical fiber cable of claim 1, wherein said blocking means includes a waterblocking material which is disposed in said tubular member, which is effective to consume oxygen and moisture and which is relatively non-reactive with said tubular member.

3. The optical fiber cable of claim 2, wherein said cable also includes an additional material which is effective to scavenge for or consume oxygen or moisture or both.

4. The optical fiber cable of claim 2, wherein said tubular member comprises polybutylene terephthalate.

5. The optical fiber cable of claim 2, wherein said means of said sheath system which provides a hermetic seal includes a tubular metallic member which is disposed about said tubular member that is disposed about the at least one optical fiber transmission medium, which comprises a metallic material having a relatively low chemical or electrochemical reactivity and which has a sealed seam.

6. The optical fiber cable of claim 5, wherein said tubular metallic member comprises a stainless steel material.

7. The optical fiber cable of claim 5, wherein said tubular metallic member comprises copper.

8. The optical fiber cable of claim 5, wherein said sheath system also includes an outer jacket.

9. The optical fiber cable of claim 1, wherein said tubular member is a first tubular member made of a plastic material, said cable includes a second tubular member made of a plastic material and said cable includes a tubular member which comprises said hermetic seal and which is disposed between said second tubular member and said outer jacket.

10. The optical fiber cable of claim 9, wherein said first tubular member is comprised of polybutylene terephthalate.

11. The optical fiber cable of claim 2, wherein said waterblocking material comprises a waterblocking filling material which is disposed within said tubular member and which does not cause substantial discoloration of said tubular member.

12. The optical fiber cable of claim 3, wherein said scavenging materials include a waterblocking filling material which is disposed in said tubular member and a waterblocking tape.

13. The optical fiber cable of claim 12, wherein said waterblocking filling material which is disposed in said tubular member is a hydrocarbon based filling material.

14. The optical fiber cable of claim 13, wherein said tubular member comprises polybutylene terephthalate.

* * * * *